(12) United States Patent
Rhodes et al.

(10) Patent No.: US 11,554,995 B2
(45) Date of Patent: Jan. 17, 2023

(54) CHEMICALLY REACTIVE SURFACE-APPLIED WATERPROOFING FOR POST-CONSTRUCTION MATERIALS

(71) Applicant: HYCRETE, INC., Fairfield, NJ (US)

(72) Inventors: Philip Rhodes, Teaneck, NJ (US);
Jason Tuerack, Jericho, NY (US);
Shawn Redman, Fairfield, NJ (US);
Fazal Wahab, Fairfield, NJ (US)

(73) Assignee: HYCRETE, INC., Fairfield, NJ (US)

( * ) Notice: Subject to any disclaimer, the term of this patent is extended or adjusted under 35 U.S.C. 154(b) by 304 days.

(21) Appl. No.: 16/885,086

(22) Filed: May 27, 2020

(65) Prior Publication Data

US 2021/0371348 A1    Dec. 2, 2021

(51) Int. Cl.
| C04B 41/48 | (2006.01) |
| C04B 41/00 | (2006.01) |
| C04B 41/45 | (2006.01) |
| C04B 41/63 | (2006.01) |

(52) U.S. Cl.
CPC .......... *C04B 41/488* (2013.01); *C04B 41/009* (2013.01); *C04B 41/4543* (2013.01); *C04B 41/4552* (2013.01); *C04B 41/63* (2013.01)

(58) Field of Classification Search
CPC ...... C08K 3/16; C08K 3/26; C08K 2003/162; C08K 2003/164; C08K 2003/166; C08K 2003/168; C08K 2003/262; C08K 2003/265; C08K 2003/267; C08K 5/098; C08L 67/00; C04B 41/488; C04B 41/009; C04B 41/4543; C04B 41/4552; C04B 1/63; C04B 1/52; C04B 211/27; C04B 41/71; B05D 1/02; B05D 1/18; B05D 1/28; B05D 1/40

USPC ......... 427/333, 337; 106/14.13, 14.24, 14.36
See application file for complete search history.

(56) References Cited

U.S. PATENT DOCUMENTS

| 3,763,083 A | 6/1971 | Grotheer et al. |
| 3,682,718 A | 8/1972 | Palm et al. |
| 3,817,767 A | 6/1974 | Bozer et al. |
| 4,869,752 A | 9/1989 | Jaklin et al. |
| 6,071,436 A | 6/2000 | Incorvia |
| 6,277,450 B1 | 8/2001 | Katoot et al. |
| 6,605,577 B1 | 8/2003 | Harrison et al. |
| 6,869,476 B2 | 3/2005 | Shin et al. |
| 7,261,923 B2 | 8/2007 | Rhodes et al. |
| 7,407,535 B1 * | 8/2008 | Humphrey ............ C04B 41/46 252/396 |
| 7,670,415 B1 | 3/2010 | Rosenberg et al. |
| 9,206,082 B2 | 12/2015 | Baumann |
| 2004/0237834 A1 | 12/2004 | Humphrey et al. |
| 2008/0269390 A1 | 10/2008 | Weitzel |

(Continued)

OTHER PUBLICATIONS

International Application No. PCT/US2021/034449, International Search Report and Written Opinion, dated Aug. 24, 2021, 9 pages.

*Primary Examiner* — William P Fletcher, III
(74) *Attorney, Agent, or Firm* — Kilpatrick Townsend & Stockton LLP

(57) ABSTRACT

Post-construction materials, including concrete, containing water insoluble polymers are disclosed herein. The water insoluble polymers are formed beneath the surface of the post-construction material using a first composition comprising a blend of fatty acid salts and a second composition comprising alkaline earth metal halides or alkaline earth metal carbonates.

16 Claims, 3 Drawing Sheets

(56) References Cited

U.S. PATENT DOCUMENTS

2009/0297702 A1    12/2009  Vincent et al.
2010/0196723 A1     8/2010  Veramallay et al.
2012/0164467 A1     6/2012  Sobczak
2013/0337280 A1*   12/2013  Darwin ................ A01N 37/06
                                                 428/541

* cited by examiner

CHEMICALLY REACTIVE SURFACE-APPLIED WATERPROOFING FOR POST-CONSTRUCTION MATERIALS

TECHNICAL FIELD

The present disclosure generally relates to water insoluble polymers for use with post-construction materials and processes for forming the insoluble polymers by chemically reacting two compositions discreetly applied to the surface. The process forms the water insoluble polymers beneath the surface. Once formed the water insoluble polymer provides waterproofing for the post-construction material.

BACKGROUND

The cost of corrosion and other structural defects in materials is devastating with respect to damage and deterioration to structures as well as the potential for human injury. From a financial perspective, the cost of corrosion alone is estimated to be over $300 billion each year in the United States. The problem of preventing corrosion and addressing other potential structural defects remains a challenge confronting the construction and maintenance industries.

Commonly, structures are made of concrete materials. Because conventional concrete has very low tensile strength, it is common practice to reinforce concrete with steel bars in applications where the concrete is subjected to substantial loads. In such implementations, the concrete has at least two functions. One function is to protect the reinforcing steel bars against corrosion. Another prominent function is to improve resistance from shear and compressive stresses. As a general matter, the protective effect of hardened concrete against climatic and environmental conditions on reinforcing steel depends, for example, on the amount and type of cement, water/cement factor and concrete integrity. However, since concrete is also a permeable absorptive material, concrete is often subject to undesirable intrusion of moisture and other substances, each of which can lead to corrosion of the reinforcing steel.

Indeed, concrete is widely known to be a porous material with a vast network of interconnected pores. When the pores of concrete are occupied by water and the relative humidity of the ambient atmosphere is unsaturated, moisture vapor will be emitted from the concrete. In many circumstances, the moisture vapor emissions from concrete simply become part of the humidity of the air. However, in some circumstances, especially involving concrete slabs that accommodate flooring overlay materials, the moisture vapor emission from the concrete causes negative consequences, such as degradation of the flooring glue and delamination of the flooring material. For at least the foregoing reasons, it is advantageous to reduce or eliminate the moisture vapor emission from concrete.

There are numerous methods in practice for reducing moisture vapor emission from concrete systems. Particular methods are frequently employed based at least in part on the source of the moisture-at-issue. In the case of free mix water or surface rain water potentially emerging from a concrete structure/system, various sealant systems and drying techniques have been used to reduce the rate of moisture vapor emission to acceptable levels. These methods are expensive and labor intensive to apply. In the case of groundwater wicking through a concrete slab and emerging as moisture vapor, various polymer sheet vapor barriers have been used to prevent or reduce the degree to which the groundwater contacts the concrete and wicks therethrough. Such sheets involve additional cost/labor and are susceptible to various levels of unreliability due to seams and punctures.

It is noted that efforts have been made to solve the premature deterioration of concrete structures. For example, U.S. Pat. No. 4,869,752 to Jaklin describes the use of modified inorganic silicates, e.g., modified alkali silicates, as a concrete additive to prevent corrosion of steel structures or reinforcing steel. U.S. Pat. No. 6,277,450 to Katoot describes the use of a coating process to coat metal surfaces which are modified to an active moiety of metal hydroxide receptive to a fully cross-linked polymer of various thickness. Other processes that have been used have included precoating surfaces of metals used in the building and construction industry. However, such methods are generally costly, ineffective and inefficient/impractical.

Previous efforts have also relied on treatments that react with the divalent metals in the material. Although this has been effective in filling some of the voids, some types of post-construction materials lack divalent metals. Further, the relatively low amounts of divalent metals limit the ability to fill voids in a consistent and reliable manner.

Despite efforts to date, a need remains for treatments, materials and processes that can reduce and/or eliminate vapor transmission, e.g., moisture transmission, through porous structures such as concrete-containing structures in an efficient, reliable and cost-effective manner. These and other needs are advantageously satisfied by the disclosed Water insoluble polymers and methods.

SUMMARY

The present disclosure generally relates to improved waterproofing post-construction materials. In one embodiment, there is provided a method for treating a post-construction material, e.g., concrete, having a surface by allowing a first composition comprising a blend of fatty acid salts each having from one (1) to four (4) acid groups to migrate through the surface, optionally drying the post-construction material, removing at least a portion of the fatty acid salts from the surface, and reacting a second composition with the fatty acid salts beneath the surface to form one or more water insoluble polymers. In one embodiment, the blend of fatty acids contains at least one fatty acid salt having the following formula:

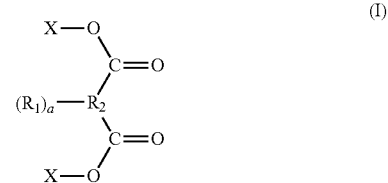

wherein:
X is independently an alkali metal, hydrogen, or ammonium, provided that at least one X is an alkali metal;
$R_1$ is a linear or branched $C_3$-$C_{20}$ alkyl group, or a linear or branched $C_3$-$C_{20}$ alkenyl group;
a is an integer from 1 to 3; and
$R_2$ is a linear $C_1$-$C_{10}$ alkylene group.

The second composition, which is also surface-applied, may comprise an alkaline-earth metal halide, alkaline-earth metal carbonate or combinations thereof.

In another aspect, the present disclosure provides a post-construction material having at least one surface and a void area, comprising one or more water insoluble polymers having the following formula (II) or formula (III):

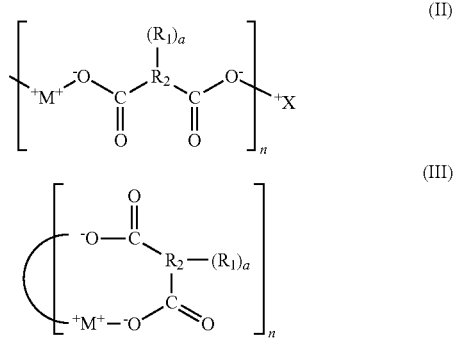

wherein
X is independently an alkali metal, hydrogen, or ammonium;
$R_1$ is a linear or branched $C_3$-$C_{20}$ alkyl or linear or branched $C_3$-$C_{20}$ alkenyl group;
a is an integer from 1 to 3;
$R_2$ is a linear $C_1$-$C_{10}$ alkylene group;
M is an alkaline earth metal; and
n is an integer of 2 or more; and
wherein the one or more water insoluble polymers are located within the void area.

Additional features, functionalities and beneficial results associated with the disclosed solution/system and treatment modalities associated therewith will be apparent from the detailed description which follows.

BRIEF DESCRIPTION OF DRAWINGS

The disclosure is described in detail below with reference to the drawings wherein like numerals designate similar parts and wherein.

DETAILED DESCRIPTION

The present disclosure is directed, in part, to post-construction materials and one or more water insoluble polymers formed by chemically reactive surface-applied compositions. The insoluble polymers are distributed within the post-construction material to improve its waterproofing properties.

In one embodiment, the water insoluble polymers are formed beneath the surface of the post-construction material and the formation does not reduce the strength properties or change the surface appearance. For purposes of this disclosure the term beneath the surface means within the post-construction material or within the void areas of the post-construction material. Thus, the polymerization of the blend of the fatty acid salts does not occur on the surface, e.g. exposed side or visible side.

Figure 1:
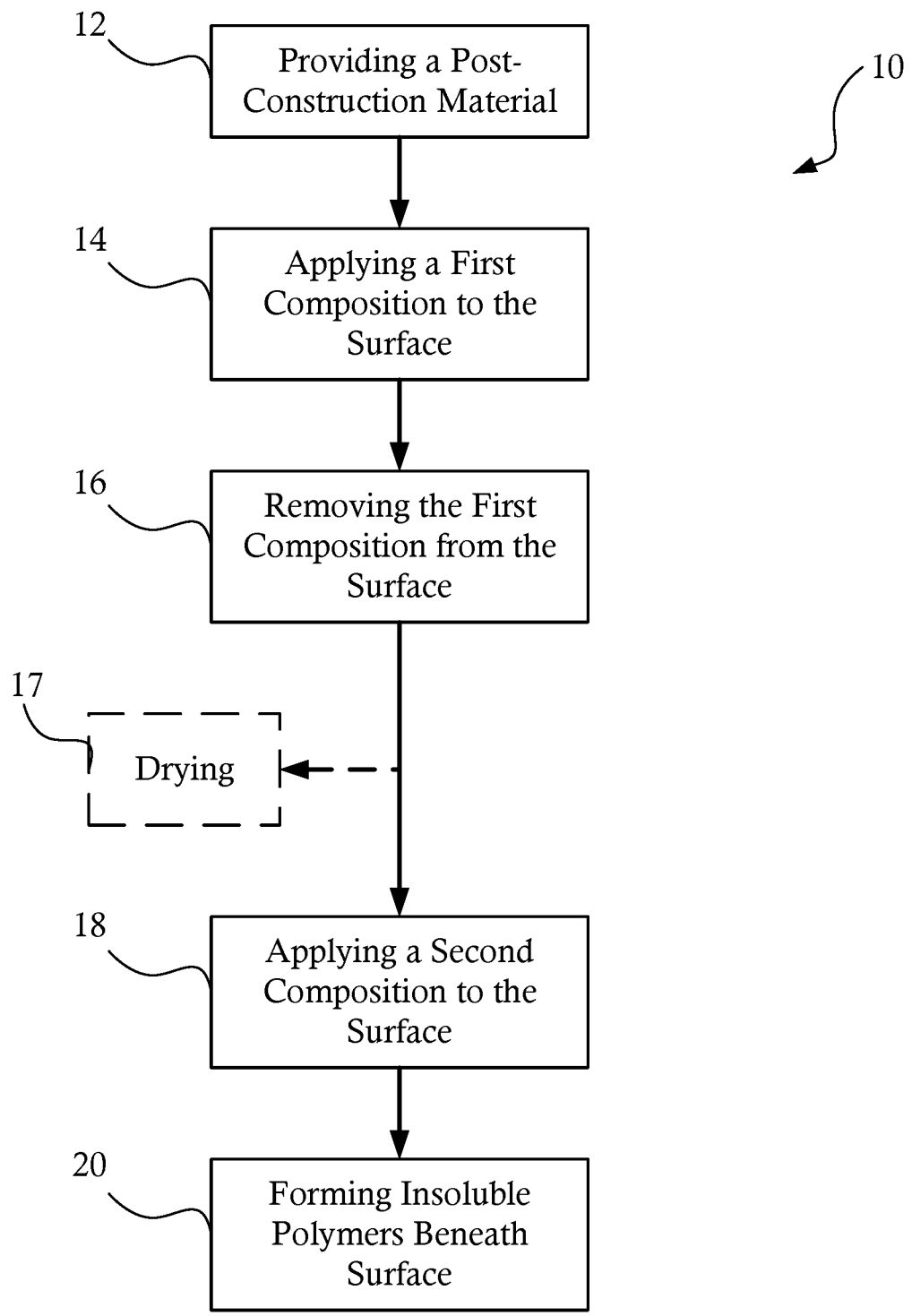
FIG. 1 is a flow diagram of a process to apply two compositions to the surface of a post-construction material in accordance with embodiments of the present disclosure.
Figure 2A:
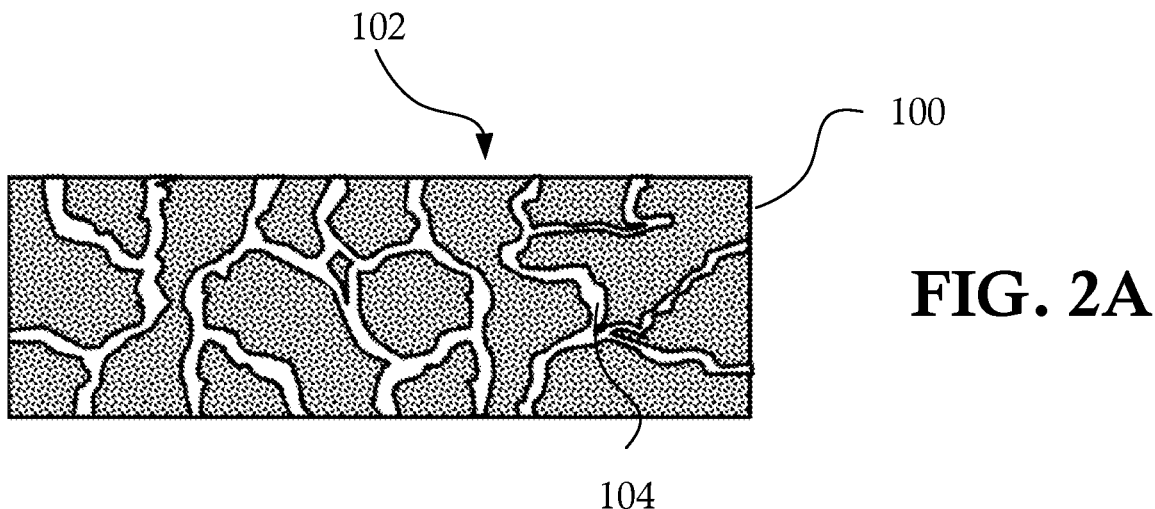
FIGS. 2A-2E are cross-sectional views of a post-construction material where two compositions are applied to a surface to form insoluble polymers beneath the surface in accordance with embodiments of the present disclosure.

FIG. 1 illustrates one embodied process according the present disclosure, which is also shown in the cross-sectional views in FIGS. 2A-2E. The chemically reactive surface-applied process 10 begins in step 12 by providing a post-construction material 100 having a surface 102 as shown in FIG. 2A. In one embodiment, the post-construction material 100 is formed or hardened prior to treatment and has no waterproofing treatment, e.g. sealants, or barriers, e.g. membranes. The surface 102 may be exposed to the environment, and may be an exterior surface that is visible. In some embodiments, the post-construction material 100 may have more than one surface exposed to the environment. The process may be repeated for each surface as needed. Exemplary implementations of post-construction materials having a surface that may be improved by the water insoluble polymers include, inter alia, deep foundation slabs and walls, podium and plaza decks, roof, parking and tunnel structures.

The post-construction materials are not particularly limited and may include cementitious compositions, concrete, reinforced concrete, asphalt, concrete asphalt, mortar, stucco, wood, and combinations thereof. The post-construction materials may include recycled aggregates. The post-construction materials suitable for treatment by the process described herein generally are porous and have void areas 104, e.g., pores that may form one or more interconnected void networks or an open-cell structure. The voids can also include cracks (including hairline cracks), fissures, capillaries, openings, etc., in the post-construction material. For purposes of illustration, FIG. 2A-2E show an example of void areas 104 being an interconnected void network in the post-construction material 100. These voids may be susceptible to moisture infiltration that can lead to further structural issues due to exposure, freeze/thaw conditions, wear and tear, etc. It is understood that exposing post-construction material to moisture may lead to structural defects. These voids also can provide a pathway for water intrusion to steel member, such as rebar, within or adjacent to the post construction material and lead to corrosion issues.

Post-construction material as used herein is referred to as being porous having from 2% to 50% (preferably from 3% to 40% or from 4% to 30%) of its volume consisting of voids primarily in the form of interconnected networks. Conventional concrete being a mixture of cement, coarse aggregates, sand, and water may have about 3% to 5% void space, and the volumes of void space may vary depending on aggregate gradations.

For simplicity, the present disclosure is directed primarily to concrete-based systems and implementations. However, the present disclosure is not limited thereto. A practical application of an exemplary post-construction material may be a bridge having a concrete road deck.

Figure 2B:
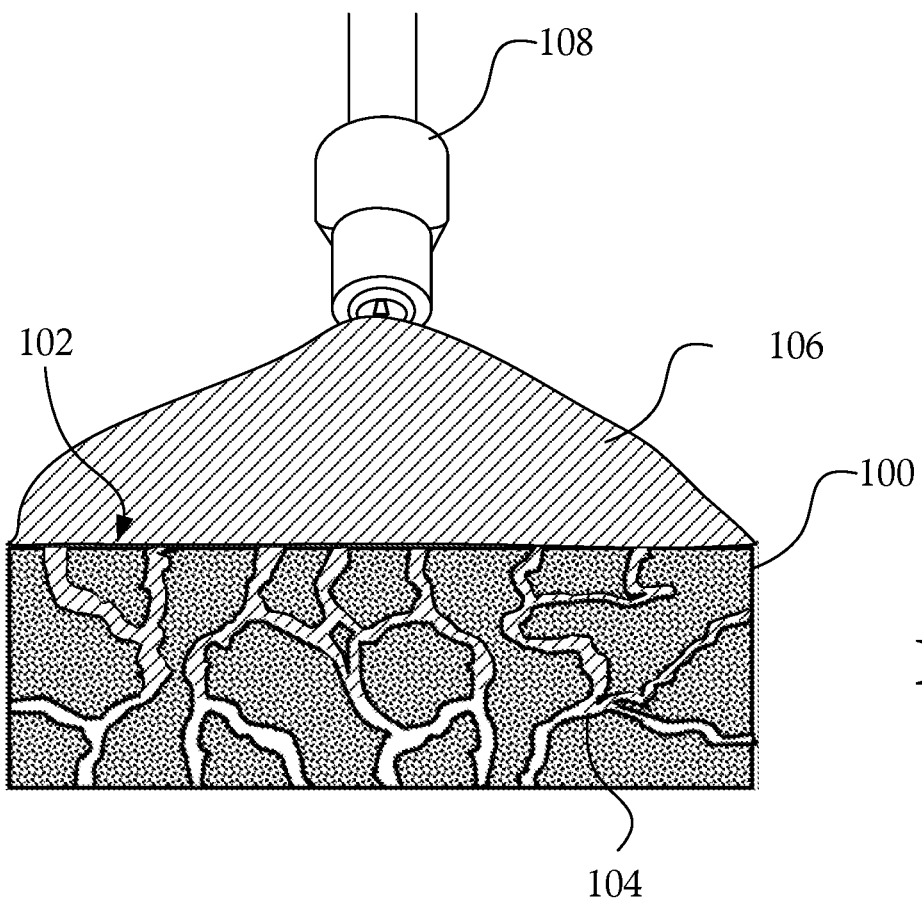
Figure 2C:
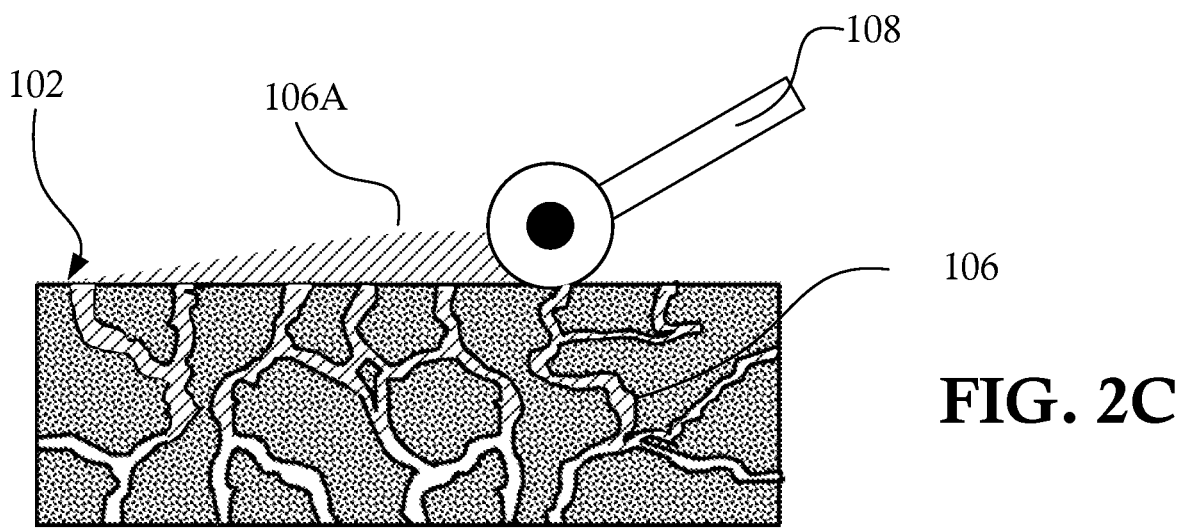

In step 14, a first composition is applied to at least one surface of the post-construction material. The first composition may be applied using a variety of acceptable techniques. As shown in FIG. 2B, the first composition 106 is applied by a sprayer 108 to the first surface 102. The sprayer 108 may be a low or high pressure sprayer. It should be understood that spraying is one example of applying the first composition 106 to the post-construction material 100, and various other techniques may be used, including brushing, rolling, misting, immersion, injection, spreading, insertion, and pressure treatment, including combinations thereof, that is sufficient to cause the first composition to migrate through the surface 102 and enter the voids 104. This allows the first composition to penetrate into the voids of the post-construction material. In one embodiment, the first composition is sprayed in an overlapping pattern. Although a single treatment of the first composition may be sufficient to allow the first composition to migrate through the surface, in some embodiments, the first composition may be applied in successive treatments to ensure migration. Thus, for example, 1 to 5 treatments of the first composition may be used.

The amount of the first composition applied to the surface may vary depending on the concentration of the blend of fatty acids. In one embodiment, approximately 1 liter of the first composition is applied to 1 to 10 $m^2$ of post-construction surface, e.g., from 1.2 to 5 $m^2$.

Prior to applying the disclosed first composition to a surface, the surface may be cleaned. In some embodiments, for example, the surface may be pressure washed to remove any existing laitance, contaminates, coatings, dirt and/or pollution. The surface may then preferably be rinsed and allowed an opportunity to dry prior to application of the first composition. However it is not necessary to completely dry and the first composition may be applied to a wet surface.

In one embodiment, the first composition comprises a blend of fatty acid salts each having from one (1) to four (4) acid groups. The blend of fatty acid salts may be water soluble and in one embodiment the first composition may be an aqueous composition comprising from 5 to 40% by weight of the blend of fatty acid salts, e.g., from 5 to 25% by weight or from 5 to 20% by weight.

The first composition comprises at least one fatty acid salt having the following formula:

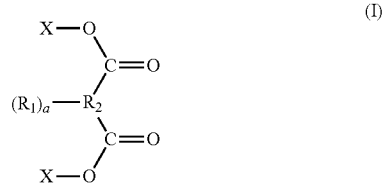

(I)

X is independently an alkali metal, hydrogen, or ammonium, provided that at least one X is an alkali metal. Suitable alkali metals include Li, Na, K, or mixtures thereof. For example, the blend may comprise fatty acids with Li salts, Na salts, and/or K salts, in various ratios. In one embodiment, the blend may comprise from 50 to 95 wt. % sodium salts and from 5 to 50 wt. % potassium or lithium salts.

$R_1$ is a linear or branched $C_3$-$C_{20}$ alkyl group, preferably a $C_8$-$C_{16}$ alkyl group, or a linear or branched $C_3$-$C_{20}$ alkenyl group, preferably $C_8$-$C_{16}$ alkenyl group. The position in the alkenyl group of the unsaturation may vary and may be an α-β-unsaturated group or a n-6 unsaturated group. The blend of fatty acid salts may have fatty acids with different $R_1$ groups. In one embodiment, the average chain length of the $R_1$ group in the blend may be greater than or equal to nine (9), preferably greater than or equal to twelve (12), which allows the weight average of the $R_1$ group to be from $C_{10}$ to $C_{16}$, preferably $C_{12}$. Formula I may have one or more $R_1$ groups, and a is an integer from one (1) to three (3).

In one embodiment, the $R_1$ group, which represents the branched side chain, may include between nine (9) and sixteen (16) carbon atoms. It has been found that branched side chains falling within an inclusive range of $C_9$ to $C_{16}$ are effective in the first composition due to water solubility. The shorter the $R_1$ group, i.e., the shorter branched hydrocarbon side chains (e.g., $C_8$ and less), are less effective because, when incorporated into a concrete-containing structure (whether at the mixing/formulation stage or at the post-construction stage), such smaller hydrocarbon side chains are highly likely to be washed away by permeating water. Thus the permeating water reduces the amount of the first composition that migrates through the surface and thus reduces the amount of the fatty acid salts available to react and form the water insoluble polymers. For longer chains, where the $R_1$ group is more than $C_{17}$, the fatty acid salts tend to have water solubility issues that prevents sufficient intrusion into the interconnected voids.

$R_2$ is a linear $C_1$-$C_{10}$ alkylene group, preferably $C_1$-$C_4$ such as methylene, ethylene, propylene, or butylene. Methylene and ethylene are suitable $R_2$ groups. When $R_2$ is greater than 1, then either there may be multiple $R_1$ groups or one $R_1$ group positioned along the $R_2$ group. In some embodiment, the $R_2$ group may have a heteroatom, such as N, O, or S.

Although the fatty acid may have from one (1) to four (4) acid groups, dioic acids are generally preferred.

In one embodiment, the fatty acid salts may include alkali metal or ammonium salts of octenyl malonic acid, decenyl malonic acid, dodecenyl malonic acid, hexadecenyl malonic acid, octenyl succinic acid, decenyl succinic acid, dodecenyl succinic acid, hexadecenyl succinic acid, octenyl pentanedioic acid, decenyl pentanedioic acid, dodecenyl pentanedioic acid, hexadecenyl pentanedioic acid, octenyl hexanedioic acid, decenyl hexanedioic acid, dodecenyl hexanedioic acid, or hexadecenyl hexanedioic acid. The blend may comprise one or more of these fatty acid salts. In one embodiment, the blend may comprise from 5% to 95%, e.g., from 60% to 90%, of dodecenyl malonic acid, dodecenyl succinic acid, dodecenyl pentanedioic acid, dodecenyl hexanedioic acid, or mixture thereof and from 5% to 95%, e.g., from 5% to 40%, of octenyl malonic acid, decenyl malonic acid, hexadecenyl malonic acid, octenyl succinic acid, decenyl succinic acid, hexadecenyl succinic acid, octenyl pentanedioic acid, decenyl pentanedioic acid, hexadecenyl pentanedioic acid, octenyl hexanedioic acid, decenyl hexanedioic acid, hexadecenyl hexanedioic acid, or mixture thereof.

Formula I-a provides the formula of a fatty acid salt wherein $R_2$ is an ethylene group and a is 1 suitable for the first composition:

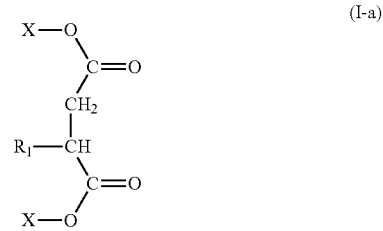

(I-a)

wherein X is independently an alkali metal, hydrogen, or ammonium, provided that at least one X is an alkali metal and $R_1$ is a linear or branched $C_3$-$C_{20}$ alkyl group, preferably a $C_8$-$C_{16}$ alkyl group, or a linear or branched $C_3$-$C_{20}$ alkenyl group, preferably $C_8$-$C_{16}$ alkenyl group.

Formula I-b provides the formula of a fatty acid salt wherein $R_2$ is an ethylene and a is 2 suitable for the first composition:

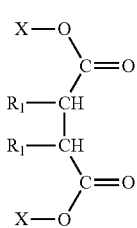

(I-b)

wherein X is independently an alkali metal, hydrogen, or ammonium, provided that at least one X is an alkali metal and $R_1$ are independently a linear or branched $C_3$-$C_{20}$ alkyl group, preferably a $C_8$-$C_{16}$ alkyl group, or a linear or branched $C_3$-$C_{20}$ alkenyl group, preferably $C_8$-$C_{16}$ alkenyl group.

The fatty acid salts may be synthesized by reacting unsaturated hydrocarbons with an anhydride, in particular maleic anhydride, at elevated temperatures, followed by vacuum distillation and a hydration reaction with deionized water to form dioic acids that may be neutralized with ammonia or a caustic solution to form salts. Suitable processes are described in U.S. Pat. Nos. 7,407,535 and 7,670,415, the entire contents and disclosure of which is hereby incorporated by reference.

In one embodiment, at least a portion of the first composition may be added during the cement formulation at various water-cement ratios. The formulation of cement mixtures is well known to persons skilled in the art, and a detailed discussion thereof will not be provided herein.

In some embodiments the first composition may comprise additives, such as thinning and/or defoaming agents. A thinning agent may be used to reduce the viscosity of the first composition to facilitate penetration into the voids of the post-construction material. Exemplary thinning agents include isopropyl alcohol, ethanol, xylene and combinations thereof. Some thinning agents may reduce reactions with the cations, such as those in the second composition. A defoaming agent is advantageously employed to address air entrainment. Exemplary defoaming agents include polyether modified polysiloxanes, tri-alkane/alkene phosphates and mixtures thereof. Polyether modified polysiloxanes are sold by BYK Chemie (Germany) under the trademarks BYK 025 and BYK 094. An exemplary phosphate for use as a defoaming agent according to the present disclosure is available from Akzo Nobel (Germany) under the trademark Phosflex 4 (tributyl phosphate). These additives are generally more useful when added to a cement formulation. Thus, when applied to a post-construction the amount of additives in the first composition may be from 0 to 50% by weight, e.g., from 0 to 30% by weight or from 0 to 10% by weight, based on the total weight of the first composition.

In the process, once a sufficient amount of the first composition is applied to the post-construction material, then the next step 16 is to remove the first composition 106A from the surface 102. While most of the first composition, in particular the fatty acid salts, migrates through the surface 102, there may be a small amount remaining on the surface after step 14. This is done to prevent formation of the insoluble water polymers on the surface when the second composition is applied. The first composition 106A may be removed by several suitable processes such as wiping, cleaning, rolling, suction, and/or pressure treatment to remove at least 50% of the fatty acid salts from the surface, e.g., at least 80% or at least 95%. Optionally, there may also be a drying step 17 at a temperature from 30° C. to 130° C. to further remove the first composition 106A from the surface 102. The drying step may also reduce any water in the void space.

Figure 2D:
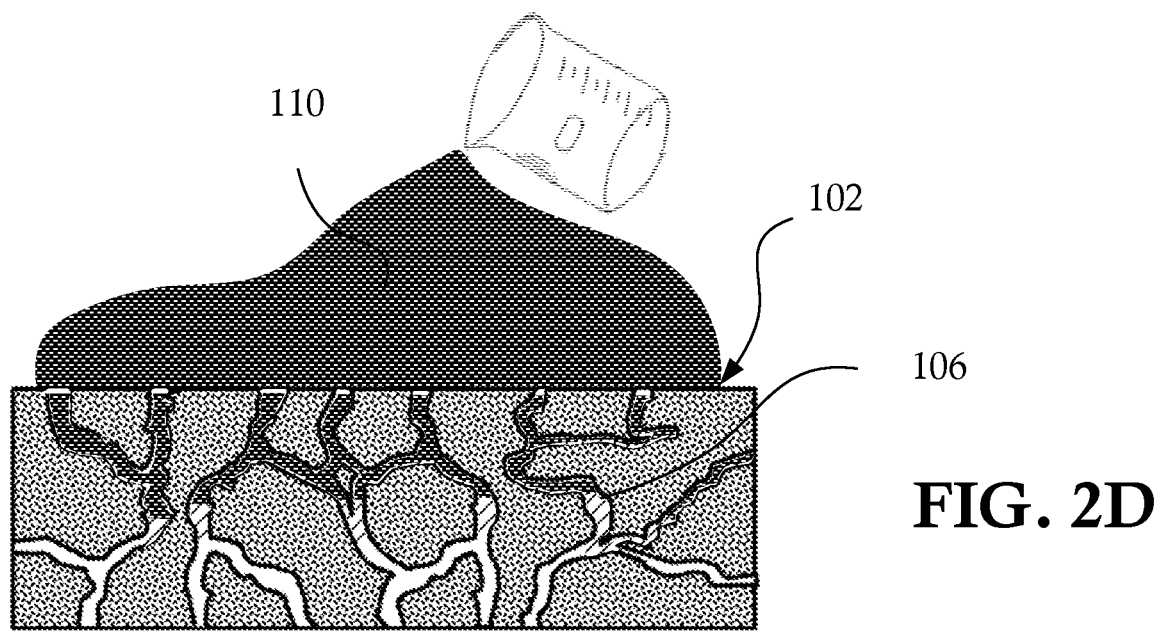

Once the first composition 106A is removed from the surface 102 and, if necessary, sufficiently dried, then a second composition 110 is applied to the surface 102. Similar to the first composition, there may be several techniques to apply the second composition 110, including spraying, brushing, rolling, misting, immersion, injection, spreading, insertion, and pressure treatment, including combinations thereof. FIG. 2D shows the second composition 110 being poured onto the surface 102. Second composition 110 migrates through the surface and into the void space now occupied by the first composition 106 and in particular the fatty acid salts of the first composition 106.

In one embodiment, the second composition may be an aqueous composition comprising from 1 to 30 wt. %, e.g., from 5 to 15 wt. %, of an alkaline-earth metal halide, alkaline-earth metal carbonate or combinations thereof. Although alkaline-earth metal compounds are preferred, the second composition may be a suitable divalent metal salt. Exemplary compounds for the second composition may include magnesium chloride, magnesium bromide, magnesium iodide, magnesium carbonate, magnesium bicarbonate, calcium chloride, calcium bromide, calcium iodide, calcium carbonate, calcium bicarbonate, strontium chloride, strontium bromide, strontium iodide, strontium carbonate, strontium bicarbonate or combinations thereof. In one embodiment, to maintain the formation of the water insoluble polymer to the second composition is substantially free of silane and/or siloxane.

Figure 2E:
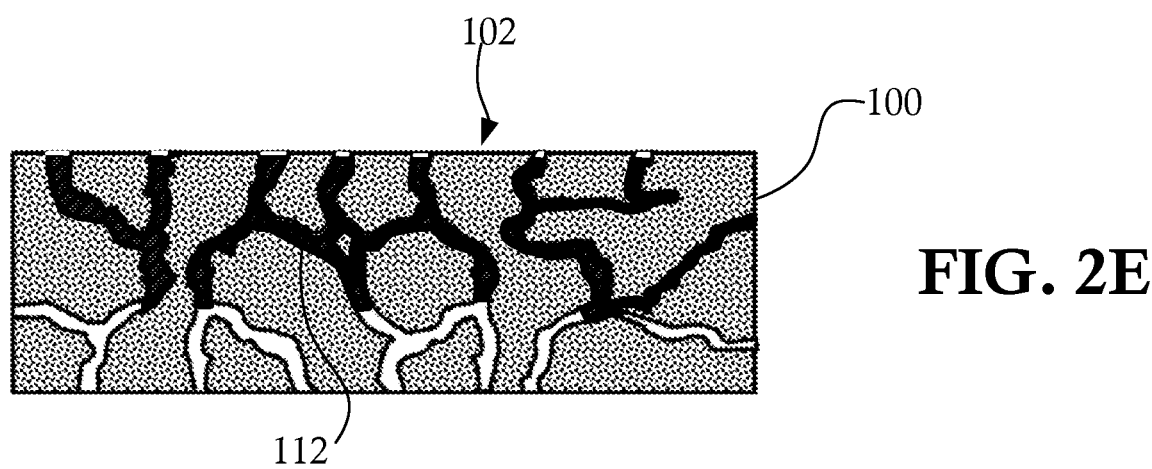

Similar to the first composition, the second composition migrates through the surface and into the voids 104 that are now occupied by the fatty acid salts of the first composition. The conditions are suitable for reacting the alkaline-earth metal halide, alkaline-earth metal carbonate or combinations thereof in the second composition with the fatty acid salts. This polymerization reaction may be an ion exchange to form the water insoluble polymers 112 as shown in FIG. 2E. According to the process disclosed herein, the reaction occurs within the post-construction material and beneath the surface. Beneath the surface is generally used refer to the void space that is not exposed to the environment on the surface and thus is within the post-construction material. Thus, the water insoluble polymers 112 are formed within the voids 104 to reduce capillary absorption of water. In addition, by forming the water insoluble polymers below the surface there is no adverse effect on the surface properties of the post-construction material. The appearance of the post-construction material is not affected by discoloration. Further, the water insoluble polymers provide long lasting protection and are not worn off by abrasion, wear, or surface defects. In one embodiment, the surface comprises no more than 5% of the water insoluble polymer based on the total amount of the water insoluble polymer formed, e.g., no more than 2% or no more than 1%.

Although the post-construction material may, in some cases, have divalent metal ions, e.g. $Ca^{+2}$, the use of a second composition increases the amount of divalent metals leading to formation of more polymer and in one embodiment longer chain polymers. Further, the reaction to form the water insoluble polymer occurs in the presence of water and the use of the second composition provides a sufficient amount of water. This allows the process to control the formation of the water insoluble polymers by providing the second composition with a compound with a favorable dissociation constant and suitable amount of water for the reaction.

In one embodiment, an excess molar amount of the second composition may be used to react with the first composition. In addition, any residual products, e.g., non-polymer products, may be washed away from the post-construction material during and/or after the chemical reaction. Thus, the post-construction materials contain a low content of unreacted alkaline-earth metal halide, alkaline-earth metal carbonate or combinations thereof, e.g., less than 0.5% by weight or less than 0.25% by weight. In addition, the post-construction materials contains no more than 1% by weight of residual starting material, e.g., no more than 0.5% by weight. Further washing may reduce the residual starting material as well as unreacted alkaline-earth metal halide, alkaline-earth metal carbonate or combinations thereof.

The water insoluble polymers are hydrophobic and improve the water resistance of the post-construction material. In one embodiment, the one or more water insoluble polymers have the following formula (II) or formula (III):

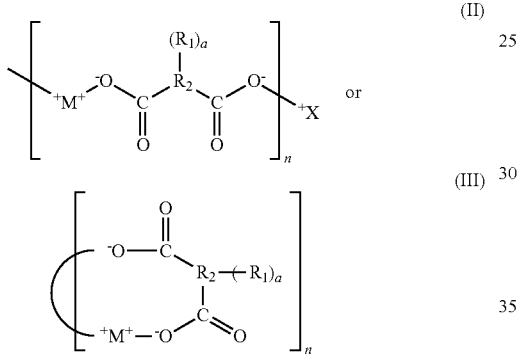

As defined herein, X is independently an alkali metal, hydrogen, or ammonium, $R_1$ is a linear or branched $C_3$-$C_{20}$ alkyl group or $C_3$-$C_{20}$ alkenyl group, and $R_2$ is a linear $C_1$-$C_{10}$ alkylene group. M is an alkaline earth metal, such as calcium or magnesium, and n is an integer of 2 or more, e.g., 4 or more, 8 or more, or 10 or more. Due to the formation beneath the surface and within the void spaces, the number of repeating units (n) may vary in each of the water insoluble polymers. Thus, some of the polymers may be shorter chains, from 2 to 8 repeating units, while other polymers may be longer chains, greater than 8 repeating units. In view of the varying repeating units, the water insoluble polymers formed beneath the surface may have an average molecular weight of greater than 1000 Daltons, e.g., greater than 2000 Daltons. The higher the molecular weight the greater the moisture resistance.

In one embodiment the molar ratio of M groups, i.e. the linking alkaline earth metal, may be greater than the terminal X group. For example, the molar ratio of M to X may be greater than 1.1, e.g., greater than 1.5, greater than 2 or greater than 3.

In addition to different chain lengths for the water insoluble polymers, there may be a mixture of water insoluble polymers. The first composition, as provided herein, is a blend of fatty acids and thus may form polymers with different monomer groups when reacted with the second composition. In one embodiment, the water insoluble polymers contain repeating units having at least two different $R_1$ groups. For example, the $R_1$ group for each monomer group may be a different chain length or one repeating unit may comprise $R_1$ as alkyl group, while another $R_1$ may be an alkylene group. Thus, the water insoluble polymer may comprise different repeating units having the formula (II) or formula (III).

In one embodiment, the water insoluble polymer may include a mixture of linear polymers of formula (II) and/or cyclic polymers of formula (III).

In some embodiments, the water insoluble polymers may be cross-linked through $R_1$ chains.

The post-construction materials containing the disclosed water insoluble polymers advantageously deliver integral moisture resistance and improved waterproofing that reduces the use of external membranes, coatings and sheeting treatments. With the disclosed materials, compositions and systems, concrete may achieve hydrophobic performance (e.g., less than 1% absorption, less than 0.5% absorption, less than 0.4% absorption, or less than 0.25% absorption). As described herein, treatment with the first and second composition transforms post-construction materials, e.g., concrete from having a void space with an open network of capillaries and cracks into one that exhibits ultra-low absorption characteristics, thereby effecting a desirable level of waterproofing. By improving waterproofing the water insoluble polymers also provide anti-corrosive functionality to post-construction materials that contain metal, e.g., steel bars such as rebar.

The present disclosure is further understood by the following non-limiting examples.

EXAMPLES

Example 1

Absorption testing was performed on hardened Portland concrete cylinders. Each cylinder was about 150 mm in height and about 77 mm in diameter. The apparent (dry) density of the concrete cylinders was approximately 2.36 g/cc.

One set of concrete cylinders were prepared to form a water insoluble polymer beneath the surface. The water insoluble polymer was formed by the surface-applied process described in FIG. 1. An aqueous composition was sprayed onto the surface of the concrete cylinder. The aqueous composition (first composition) was a blend of sodium/lithium salts of 90% of dodecenyl succinic acid and 10% of $C_8$-$C_{16}$ of succinic acids. Once applied the surface, any excess was removed by wiping the surface with a clean cloth and the concrete cylinder was dried. Next another aqueous composition (second composition) of calcium chloride was applied to the surface by spraying.

To demonstrate the improvement in absorption provided by the water insoluble polymers, two different comparative waterproofing treatments were tested. One set of concrete cylinders were prepared using an admixture of the fatty acid salts in the concrete mixture prior to hardening, without using the second composition of calcium chloride. A blend of lithium/sodium salts of dodecenyl succinic acid, decenyl succinic acid, and dodecenyl succinic acid was mixed with the mortar and hardened into the concrete cylinders. Another set of concrete cylinders were sprayed with a colloidal silica liquid commercially available as SCP 327 from Spray-Lock. The coverage rate for SCP 327 is 3.9 to 4.9 m² per 1 liter.

Each of the concrete cylinders was tested by complete immersion into a water bath to simulate prolonged exposure. Each cylinder was soaked for up to 6 days. Each day some of the cylinders were removed, dried and weighed and then immersed for 30 minutes. Table 1 reports the absorption % based on the weight increase of the concrete cylinder before immersion and after 30 minutes. The weight increase is attributed to the absorption of water. Absorption was calculated by multiplying the weight increase and a correction factor ((volume)/(surface area)*12.5) to account for any differences in the concrete cylinders. For each day, four cylinders were tested with a control (untreated), two comparative treatments colloid silica (SCP 327) and admixture of a blend of fatty acid salts, and the water insoluble polymer as described by the invention and the absorption percentage is reported each day after immersion.

TABLE 1

| | Absorption % | | |
|---|---|---|---|
| | | Comparative | Inventive |
| Day | Control | SCP 327 | Admixture | Example 1 |
| 1 | 1.00% | 0.89% | 0.14% | 0.16% |
| 2 | 0.82% | 0.72% | 0.17% | 0.10% |
| 3 | 0.88% | 0.80% | 0.26% | 0.17% |
| 4 | 0.93% | 0.86% | 0.33% | 0.24% |
| 5 | 0.92% | 0.85% | 0.38% | 0.30% |
| 6 | 1.04% | 0.97% | 0.46% | 0.38% |

The inventive treatment demonstrated excellent waterproofing properties. The low absorption even after several days indicates that the water insoluble polymers beneath the surface were preventing moisture penetration. Notable improvement was demonstrated over the other surface applied treatment using SCP 327. Under these testing conditions, SCP 327 showed limited absorption improvement over the control. Both the admixture comparative and inventive example 1 outperformed the SCP 327 surface treatment.

In the inventive example, once the calcium chloride composition was applied, the cylinder was inspected and no staining or discolorization was visible prior to immersion. Further the apparent density of the concrete cylinder with the inventive treatment was relatively unchanged, approximately 2.36 g/cc.

After testing, the concrete cylinders were cut in two halves and a visual water drop test was performed on the cut surface. On the control, the water drop was rapidly absorbed. On the inventive cylinder half, the water drop beaded and did not penetrate through the surface. This was repeated over several days and the same results were obtained. This indicates that water insoluble polymer was formed within the concrete cylinder and beneath the surface.

Example 2

Similar to Example 1, absorption testing was performed on hardened Portland concrete cylinders. Each cylinder was about 153 mm in height and about 77 mm in diameter. The apparent (dry) density of the concrete cylinders was approximately 2.30 g/cc.

One set of concrete cylinders were prepared to form a water insoluble polymer beneath the surface. The water insoluble polymer was formed by the surface-applied process described in FIG. 1. An aqueous composition (first composition) was sprayed onto the surface of the concrete cylinder. The aqueous composition was a blend of sodium/lithium salts of 90% of dodecenyl succinic acid and 10% of $C_8$-$C_{16}$ of succinic acids. Once applied the surface, any excess was removed by wiping the surface with a clean cloth and the concrete cylinder was dried. Next another aqueous composition of calcium chloride was applied to the surface.

One set of concrete cylinders were prepared using an admixture of the fatty acid salts, as described above. An untreated control was also used for comparison and to demonstrate the improvement of example 2 in terms of absorption.

Table 2 reports the absorption % based on the daily weight increase of the concrete cylinders that were soaked for up to 8 days before immersion ($W_O$) and after 30 minutes ($W_{30}$) of complete water immersion. Absorption was calculated by multiplying the weight increase and a correction factor (V/SA*12.5) to account for any differences in the concrete cylinders. The results reported in Table 2 are the average of testing four cylinder blocks.

TABLE 2

| | Control | | | Admixture | | | Inventive Example 2 | | |
|---|---|---|---|---|---|---|---|---|---|
| Day | Wo (g) | $W_{30}$ (g) | % | Wo (g) | $W_{30}$ (g) | % | Wo (g) | $W_{30}$ (g) | % |
| 1 | 1641.8 | 1656.8 | 1.13% | 1640.4 | 1641.3 | 0.07% | 1630.2 | 1630.7 | 0.03% |
| 2 | 1647.5 | 1659.8 | 0.92% | 1639.9 | 1640.9 | 0.07% | 1629.8 | 1630.6 | 0.06% |
| 3 | 1650.0 | 1660.9 | 0.81% | 1639.7 | 1640.7 | 0.07% | 1629.5 | 1630.2 | 0.05% |
| 4 | 1647.6 | 1660.1 | 0.93% | 1639.0 | 1640.2 | 0.09% | 1629.0 | 1629.7 | 0.06% |
| 5 | 1652.2 | 1661.8 | 0.71% | 1639.3 | 1640.6 | 0.10% | 1629.2 | 1630.0 | 0.06% |
| 6 | 1653.6 | 1661.8 | 0.61% | 1639.4 | 1640.9 | 0.11% | 1629.1 | 1630.1 | 0.07% |
| 7 | 1654.3 | 1661.6 | 0.55% | 1639.5 | 1641.0 | 0.12% | 1629.2 | 1630.2 | 0.07% |
| 8 | 1654.7 | 1661.7 | 0.52% | 1639.5 | 1641.3 | 0.14% | 1629.2 | 1630.4 | 0.09% |

Inventive example 2 show that the absorption rates remain very low for the surface-applied process even after 8 days of soaking. There is a slight improvement over the admixture, but inventive example 2 indicates that the water insoluble polymer is more durable over longer periods of exposure to water. Thus, the water insoluble polymers formed beneath the surface extends the useful life of concrete.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only, and is not intended to limit the invention.

Finally, all patents, publications, and applications referenced herein are incorporated by reference in their entireties.

What is claimed is:

1. A method for treating a post-construction material having a surface, wherein the method comprises the steps of:
    applying to the surface a first composition comprising a blend of fatty acid salts each having from one (1) to four (4) acid groups and allowing a first portion of the first composition to migrate through the surface, wherein a second portion of the first composition stays on the surface;
    removing at least some of the second portion of the first composition from the surface;
    applying to the surface a second composition comprising an alkaline-earth metal halide, alkaline-earth metal carbonate, or a combination thereof and allowing a first portion of the second composition to migrate through the surface and react with the fatty acid salt beneath the surface to form one or more water insoluble polymers.

2. The method of claim 1, further comprising drying the post-construction material during or after removing the at least some of the second portion of the first composition from the surface, wherein the drying is carried out at a temperature from 30° C. to 130° C.

3. The method of claim 1, wherein the first composition comprises from 5 to 40 wt. % of the blend of fatty acid salts, based on the total weight of the first composition.

4. The method of claim 1, wherein the first composition is an aqueous composition.

5. The method of claim 1, wherein the first composition is applied to the surface by spraying, rolling, misting, immersion, injection, spreading, insertion, pressure treatment or combinations thereof.

6. The method of claim 1, wherein the first composition further comprises thinning and/or defoaming agents.

7. The method of claim 1, wherein the blend of fatty acid salts contains at least one fatty acid salt having the following formula:

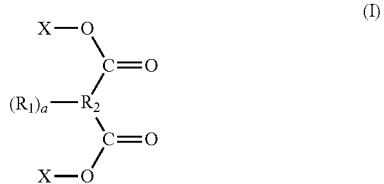

(I)

wherein:
    each X is independently an alkali metal, hydrogen, or ammonium, provided that at least one X is an alkali metal;
    each $R_1$ is independently a linear or branched $C_3$-$C_{20}$ alkyl group, or a linear or branched $C_3$-$C_{20}$ alkenyl group;
    each a is independently an integer from 1 to 3; and
    each $R_2$ is independently a linear $C_1$-$C_{10}$ alkylene group, and
    wherein X, $R_1$ and $R_2$ can be different for different fatty acids.

8. The method of claim 1, wherein the blend of fatty acid salts comprises more than one fatty acid salt of Formula I, and wherein the salts of Formula I have a weighted average of $R_1$ from $C_{10}$ to $C_{16}$.

9. The method of claim 1, wherein the first portion of the first composition migrates into a void area beneath the surface of the post-construction material.

10. The method of claim 1, wherein the post-construction material comprises concrete, reinforced concrete, mortar, stucco, wood, or a combination thereof.

11. The method of claim 1, wherein the removing step comprises removing at least 50% of the second portion of the first composition from the surface.

12. The method of claim 1, wherein the second composition comprises from 1 to 30 wt. % of the alkaline earth metal halide, the alkaline earth metal carbonate, or the combination thereof, based on the total weight of the second composition.

13. The method of claim 1, wherein the second composition comprises magnesium chloride, magnesium bromide, magnesium iodide, magnesium carbonate, magnesium bicarbonate, calcium chloride, calcium bromide, calcium iodide, calcium carbonate, calcium bicarbonate, strontium chloride, strontium bromide, strontium iodide, strontium carbonate, strontium bicarbonate or a combination thereof.

14. The method of claim 1, wherein the second composition is substantially free of silane and/or siloxane.

15. The method of claim 1, wherein at least one of the one or more water insoluble polymers has the following formula (II) for formula (III):

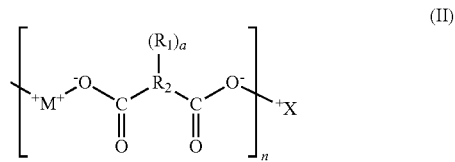

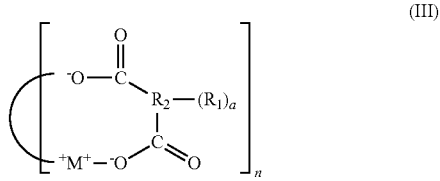

wherein
    each X is independently an alkali metal, hydrogen, or ammonium;
    each $R_1$ is independently a linear or branched $C_3$-$C_{20}$ alkyl group or a linear or branched $C_3$-$C_{20}$ alkenyl group;
    each a is independently an integer from 1 to 3;
    each $R_2$ is independently a linear $C_1$-$C_{10}$ alkylene group;
    each M is independently an alkaline earth metal; and
    n is an integer of 2 or more, and
wherein at least a portion of the one or more water insoluble polymers is located within a void area beneath the surface of the post-construction surface.

16. The method of claim 1, wherein the one or more water insoluble polymers have an average molecular weight of greater than 1000 Daltons.

* * * * *